July 8, 1947. H. E. RHEA ET AL 2,423,519
REFLECTED WAVE DIRECTION FINDER
Filed Dec. 24, 1943
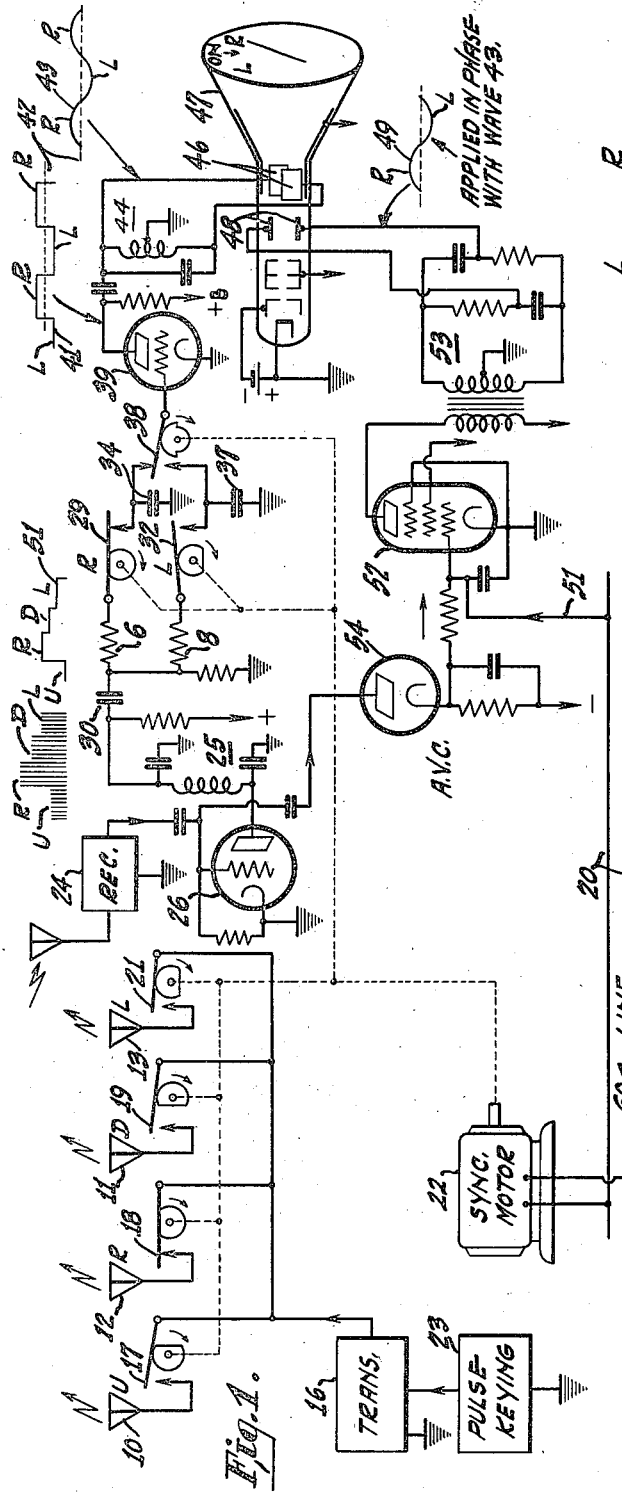
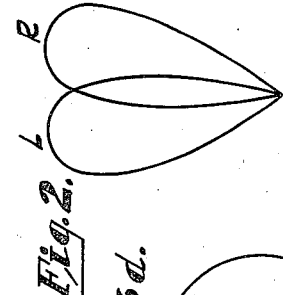
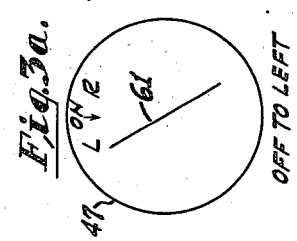
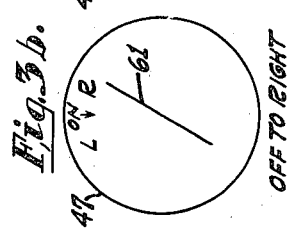
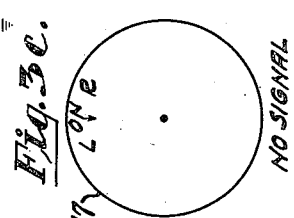
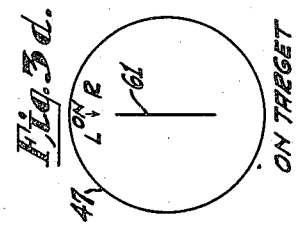
Inventors
HENRY E. RHEA
FRANK P. WIPFF
By C. D. Cushka
Attorney Patented July 8, 1947

2,423,519

UNITED STATES PATENT OFFICE 2,423,519

REFLECTED WAVE DIRECTION FINDER

Henry E. Rhea, Collingswood, N. J., and Frank P. Wipff, Dallas, Tex., assignors to Radio Corporation of America, a corporation of Delaware Application December 24, 1943, Serial No. 515,498

7 Claims. (Cl. 250—1.72)

Our invention relates to cathode ray indicator systems and particularly to systems for indicating the position of an object with respect to a radio transmitter.

The invention will be described specifically as applied to a pulse-echo system wherein the transmitter radiates signals from antennas having overlapping directional radiation patterns, the indicator functioning to give the position of the said object with respect to the radiation patterns, and particularly to inform an operator when the object is located at the middle of the overlapping patterns.

An object of the invention is to provide an improved indicator for direction finding or object locating apparatus.

A further object of the invention is to provide an improved cathode ray indicator system for indicating the position of an object with respect to overlapping radiation patterns.

A still further object of the invention is to provide an improved indicator for radio pulse-echo apparatus.

A still further object of the invention is to provide an improved indicator for pulse-echo gun control apparatus or the like wherein a cathode ray trace on the indicator is swung about a pivot point so that the indication resembles that given by the pointer of a meter.

In a preferred embodiment of the invention, it is applied to a pulse-echo system having a directive antenna system so designed that its radiation pattern or patterns may be rotated in both a horizontal plane and a vertical plane to search for an object such as an enemy airplane. The antenna system may consist of four directive antennas which may be keyed successively, as described, for example, in application Serial No. 259,057, filed February 28, 1939, in the name of Irving Wolff, Patent No. 2,412,702, dated December 17, 1946, and entitled Object detection and location, or an antenna system may be employed which is keyed by means of shorting condensers as described and claimed in application Serial No. 412,943, filed September 30, 1941, in the name of George H. Brown, Patent No. 2,400,736, dated May 21, 1946, and entitled Antenna systems.

For left-right indications at the receiver, the horizontal deflecting plates of a cathode ray tube have applied to them a sine wave deflecting voltage which is derived from the received pulses that have been reflected from the target or other object. This deflecting voltage may be obtained from a peak voltage measuring circuit that is switched in synchronism with the keying of the directive antennas. Thus, the horizontal deflection of the cathode ray is determined by the relative amplitudes of the reflected pulses in the two horizontal radiation patterns. The cathode ray is deflected vertically by a sine wave that is in phase with the sine wave applied to the horizontal deflecting plates and which varies in amplitude with the received signal strength. This vertical deflecting wave may be obtained from the 60 cycle line that supplies power to a synchronous motor driving the switches for keying the antennas.

The invention will be better understood from the following description taken in connection with the accompanying drawing in which Figure 1 is a circuit and block diagram of one of the preferred embodiments of my invention, Figure 2 is a diagram of the radiation patterns of the right-left directive antennas employed in the system of Fig. 1, and Figures 3a to 3d are views of the screen end of the cathode ray tube employed in the system of Fig. 1 showing the position of the cathode ray trace for different relative positions of the transmitter radiation patterns and the object or target.

In Fig. 1, my indicator is applied to a radio pulse-echo system comprising four directive antennas 10, 11, 12 and 13 for radiating up, down, right and left patterns, respectively, as indicated by the letters U, D, R and L.

The radiation patterns for these antennas are overlapping patterns of the character indicated in Fig. 2 where the patterns marked R and L correspond to the antennas similarly marked in Fig. 1. The antennas 10, 11, 12 and 13 may be like those illustrated in the above-mentioned Wolff application, or of any other suitable type, and in the particular system being described are so mounted that they may be moved to make their radiation patterns scan both horizontally and vertically.

High frequency radio pulses are supplied successively to the U, R, D and L antennas from a transmitter 16 through cam operated switches 17, 18, 19 and 21, respectively, driven by a synchronous motor 22 connected to a 60 cycle power line 20. The said pulses are obtained by modulating the high frequency carrier wave produced at transmitter 16 by means of keying pulses from a source 23. The source 23 may be a multivibrator supplying pulses recurring at the rate of 4.1 kilocycles per second, for example.

The receiver 24 demodulates the reflected pulses of high frequency energy to supply 4.1 pulses to a detector or rectifier 26 which preferably is of the peak rectifying type. In the circuit illustrated the rectifier 26 is a grid-leak biased peak rectifier tube which is well known in the television art. The output of the rectifier 26 is passed through a low pass filter 25 and supplied through a large capacity blocking condenser 30, through resistors 6 and 8 and through cam operated switches 29 and 32 to condensers 34 and 37, respectively. The output from the filter 25 is represented by the graph 51 where the four groups of filtered or integrated pulses of unequal amplitude are indicated at U, R, D, L.

The resistors 6 and 8 are provided to make the time constant of the condenser circuits long enough to smooth out and substantially eliminate the effect of any high frequency noise pulses that may be received.

A cam operated switch 38 connects the condensers 34 and 37 alternately to the grid of an amplifier tube 39 whereby a square wave 41 appears at the anode of the tube 39. The cycles R and L of the wave 41 correspond to the "right" and "left" switching cycles and have an amplitude and polarity with respect to the A.-C. axis 42 that depends upon the position of the R—L antenna radiation patterns with respect to the target.

The cam switches 32, 29 and 38 are driven in synchronism with the antenna switches 17, 18, 19 and 20 by the motor 22. Thus, when the "right" antenna switch 18 is closed, the corresponding "right" switch 29 of the indicator is also closed. Likewise, the switch 38 is closed in its upper position and will remain closed until the "left" switches 21 and 32 close. The "left" switches 21 and 32 close and the switch 38 moves to its lower position when the cams are rotated through 180 degrees, whereby the square wave 41 is produced. The "R" and "L" cycles of the wave 41 approach the A.-C. axis to become a straight line (zero square wave) when the right-left radiation patterns are symmetrical with respect to or "on" the target. The switching sequency in this particular example is U, R, D, L as will be apparent from the shape of the cams and from the direction of rotation indicated by the arrows. The complete switching cycle occupies 1/60 second in the example given.

The square wave 41 is converted into a 60 cycle sine wave 43 by applying it to a tuned circuit 44. The wave 43 is then applied to the horizontal deflecting plates 46 of the cathode ray indicator tube 47.

The vertical deflection is obtained by applying to the vertical deflecting plates 48 a sine wave 49 that has an amplitude proportional to the signal strength. This may be done by supplying a voltage from the 60 cycle power line 20 through a conductor 51, an amplifier tube 52, and a phase shifter 53 to the deflecting plates 48. The gain of the amplifier 52 is controlled in accordance with the strength of the incoming signal by means of an automatic volume control circuit comprising a diode 54 connected to the output of the receiver 24. Since the motor 22 drives the cam operated switches synchronously with the 60 cycle power supply, the "R" and "L" cycles of the sine wave 49 and of the sine wave 43 will occur synchronously. By means of the phase shifter 53, the voltage waves 43 and 49 are applied to the deflecting plates 46 and 48, respectively, exactly in phase.

The adjustment of the A. V. C. for the circuit applying the sine wave 49 to the deflecting plates 48 is such that the two waves 43 and 49 do not change in amplitude ratio with changes in signal strength. However, as previously explained, the wave 43 goes to zero amplitude when the right and left antenna radiation patterns are centered with respect to a target. Therefore, for the "on target" position the only deflecting voltage for the cathode ray tube is the voltage wave 49 applied to the vertical deflecting plates 48, and the "on target" indication is a vertical trace 61 as shown in Fig. 3d.

If the target is off to the right of the center line of the R—L radiation pattern (the condition represented by graphs 51, 41 and 43), the deflecting wave 43 on the horizontal deflecting plates 46 will deflect the cathode ray to the right (as viewed looking toward the fluorescent screen) whereby the trace 61 shown in Fig. 3b is obtained. If the vertical and horizontal deflection components are equal, the trace 61 will be 45 degrees from the vertical.

As the center line of the antenna radiation pattern R—L is swung towards the target, the amplitude of the wave 43 approaches zero and the trace 61 pivots about its center point towards the vertical. If the center line of the antenna radiation pattern R—L swings past the target, the trace 61 swings past the vertical to a position as shown in Fig. 3a. If there is no incoming signal, there are no deflecting voltages on the deflecting plates 46 and 48 and the only indication on the cathode ray tube screen is a spot as shown in Fig. 3c.

From the foregoing it will be seen that we have provided a cathode ray tube indicator that gives an indication of the same type as that given by a pivoted meter needle or pointer, and that we have also provided an indicator that will not give a false reading when there is no incoming signal. It will be understood that an indicator similar to the one described above may also be provided to give the "up-down" indications.

We claim as our invention:

1. In a radio pulse-echo system, a plurality of directive antennas having overlapping radiation patterns in a certain plane, a radio pulse transmitter unit and a radio pulse receiver unit, means for switching said antennas successively to at least one of said units, a cathode ray tube indicator having a pair of horizontal deflecting elements and a pair of vertical deflecting elements, means for obtaining a sine wave having a peak-to-peak amplitude that is a measure of the relative amplitudes of the two groups of reflected pulses in said plane, means for applying said signal wave to one pair of said deflecting elements, and means for applying to the other pair of deflecting elements a sine wave which is in phase with said first wave.

2. In a radio pulse-echo system, a plurality of directive antennas having overlapping radiation patterns in a certain plane, a radio pulse transmitter unit and a radio pulse receiver unit, means for switching said antennas successively to at least one of said units, a cathode ray tube indicator having a pair of horizontal deflecting elements and a pair of vertical deflecting elements, means for obtaining a sine wave having a peak-to-peak amplitude that is a measure of the relative amplitudes of the two groups of reflected pulses in said plane and that varies in amplitude with the strength of the received signal, means for applying said signal wave to one pair of said deflecting elements, and means for applying to the other pair of deflecting elements a sine wave which is in phase with said first wave and which varies in amplitude with variations in the strength of the received signal.

3. An indicator for a radio pulse-echo system of the type comprising a plurality of directive antennas having overlapping radiation patterns in a certain plane, a radio pulse transmitter unit and a radio pulse receiver unit, means for switching said antennas successively to at least one of said units, said indicator comprising a cathode ray tube having a pair of deflecting elements, means for obtaining a sine wave that is a measure of the relative amplitudes of the two groups of reflected pulses in said plane, means for applying said wave to said pair of deflecting elements to deflect the cathode ray of said tube in one direction, means for deflecting the cathode ray of said tube sinusoidally substantially at right angles to and in phase with the deflection produced by said wave, and means for making the relative amplitudes of said two deflections substantially independent of variations in the strength of the incoming signal.

4. In a radio pulse-echo system, a plurality of directive antennas having overlapping radiation patterns in a certain plane, a radio pulse transmitter unit and a radio pulse receiver unit, means for switching said antennas successively to at least one of said units, a cathode ray tube indicator having a pair of deflecting elements, means for obtaining a square wave that is a measure of the relative amplitudes of the two groups of reflected pulses in said plane, means for converting said square wave to a sine wave, means for applying said sine wave to said pair of deflecting elements, and means for deflecting the cathode ray of said tube sinusoidally substantially at right angles to and in phase with the deflection produced by said sine wave.

5. In a radio pulse-echo system, a plurality of directive antennas having overlapping radiation patterns in a certain plane, a radio pulse transmitter unit and a radio pulse receiver unit, means for switching said antennas successively to at least one of said units, a cathode ray tube indicator having a pair of deflecting elements, means comprising two storage capacitors for obtaining thereacross two voltages, respectively, which are a measure of the amplitudes of the two groups of reflected pulses in said plane, switching means for converting said two voltages to a square wave that is a measure of the relative amplitudes of the two groups of reflected pulses in said plane, means for converting said square wave to a sine wave, means for applying said sine wave to said pair of deflecting elements, and means for deflecting the cathode ray of said tube sinusoidally substantially at right angles to and in phase with the deflection produced by said square wave.

6. The invention according to claim 5 wherein said last means includes a second pair of deflecting elements and wherein means is provided for applying to said second pair of elements a sine wave that decreases in amplitude in response to a decrease in the amplitude of the received signal.

7. The invention according to claim 5 wherein said last means includes a second pair of deflecting elements and wherein there is applied to said second pair of elements a sine wave taken from a power line having a frequency that is synchronous with said switching, and wherein means is provided to make the amplitude of said last sine wave decrease in amplitude in response to a decrease in amplitude of the received signal.

HENRY E. RHEA.
FRANK P. WIPFF.

REFERENCES CITED

The following references are of record in the file of this patent:

UNITED STATES PATENTS

| Number | Name | Date |
|---|---|---|
| 2,207,267 | Plaistowe | July 9, 1940 |